(12) United States Patent  
Howley et al.

(10) Patent No.: US 12,359,941 B2
(45) Date of Patent: Jul. 15, 2025

(54) ENCODER APPARATUS (71) Applicant: RENISHAW PLC, Wotton-under-Edge (GB)

(72) Inventors: Colin Keith Howley, Stonehouse (GB); Simon Eliot McAdam, Nailsworth (GB); Adam Michael Whiting, Trowbridge (GB)

(73) Assignee: RENISHAW PLC, Wotton-under-Edge (GB)

( * ) Notice: Subject to any disclaimer, the term of this patent is extended or adjusted under 35 U.S.C. 154(b) by 285 days.

(21) Appl. No.: 17/296,933

(22) PCT Filed: Dec. 3, 2019

(86) PCT No.: PCT/GB2019/053407
§ 371 (c)(1),
(2) Date: May 25, 2021

(87) PCT Pub. No.: WO2020/115464
PCT Pub. Date: Jun. 11, 2020

(65) Prior Publication Data
US 2022/0026243 A1  Jan. 27, 2022

(30) Foreign Application Priority Data

Dec. 4, 2018 (EP) ..................... 18210257
Feb. 20, 2019 (GB) ..................... 1902306

(51) Int. Cl.
G01D 5/14 (2006.01)
G01D 5/245 (2006.01)

(52) U.S. Cl.
CPC ........... G01D 5/145 (2013.01); G01D 5/2457 (2013.01)

(58) Field of Classification Search
CPC ............. G01D 5/2457; G01D 5/34715; G01D 5/145; G01D 5/2451
See application file for complete search history.

(56) References Cited

U.S. PATENT DOCUMENTS 4,829,248 A   5/1989  Loubier
5,621,319 A   4/1997  Bilotti et al.
(Continued)

FOREIGN PATENT DOCUMENTS

DE   19536661 A1   4/1997
EP   0 826 138 B1  4/2001
(Continued)

OTHER PUBLICATIONS

Allegro Microsystems, "A1318 and A1319 Data Sheet, Linear Hall-Effect Sensor ICs with Analog Output Available in Miniature, Low Profile Surface Mount Package," 2009, pp. 1-10.
(Continued)

Primary Examiner — Reena Aurora
(74) Attorney, Agent, or Firm — Oliff PLC (57) ABSTRACT An incremental encoder apparatus including: a scale including a series of periodic features defining an optical incremental scale, and at least one magnetic reference mark; and a readhead. The readhead includes at least one incremental sensor configured to detect light from the optical incremental scale and to output at least one signal dependent thereon, and at least two analogue Hall sensors, each including at least two output terminal pairs, and each configured to switch repeatedly between each output terminal pair so as to reduce any inherent offset in the output of the analogue Hall sensor. The apparatus is configured to determine the presence of the reference mark from the outputs of the at least two analogue Hall sensors.

15 Claims, 8 Drawing Sheets (56) References Cited

U.S. PATENT DOCUMENTS

| | | | |
|---|---|---|---|
| 5,747,995 A | 5/1998 | Spies | |
| 6,051,971 A * | 4/2000 | Holden | G01D 5/2457 33/708 |
| 7,132,883 B2 | 11/2006 | Huijsing et al. | |
| 9,200,928 B2 * | 12/2015 | Yonezawa | G01D 5/34715 |
| 9,753,097 B2 * | 9/2017 | Romero | G01R 33/077 |
| 2015/0177027 A1 * | 6/2015 | Kato | G01D 5/34746 250/231.1 |
| 2018/0216972 A1 | 8/2018 | Slack et al. | |

FOREIGN PATENT DOCUMENTS

| | | |
|---|---|---|
| GB | 1504691 A | 3/1978 |
| JP | H08-5409 A | 1/1996 |
| WO | 86/03833 A1 | 7/1986 |
| WO | 87/07944 A1 | 12/1987 |
| WO | 01/63215 A1 | 8/2001 |
| WO | 03/058172 A2 | 7/2003 |
| WO | 2005/124282 A2 | 12/2005 |
| WO | 2014/049173 A2 | 4/2014 |
| WO | 2015/049173 A1 | 4/2015 |
| WO | 2017/042570 A1 | 3/2017 |
| WO | 2017/203210 A1 | 11/2017 |

OTHER PUBLICATIONS

Diodes Incorporated, "AH3368Q High Voltage Low Sensitivity Automotive Hall Effect Unipolar Switch," Nov. 2016, pp. 1-14.

Allegro Microsystems, "A3141, A3142, A3143, and A3144 Data Sheet: Sensitive Hall Effect Switches for High-Temperature Operation," 2005.

Allegro Microsystems, "A1101, A1102, A1103, A1104, and A1106 Data Sheet: Continuous-Time Switch Family," Oct. 27, 2016, pp. 1-13.

Allegro Microsystems, "A3245 Data Sheet Chopper-Stabilized Omnipolar Hall-Effect Switches," 2005, pp. 1-12.

Micronas, "Data Sheet: Hal 700, Hal 740, Dual Hall-Effect Sensors with Independent Outputs," Hardware Documentation, Nov. 30, 2009, pp. 1-22.

Allegro Microsystems, "3046, 3056 and 3058 Data Sheet: Hall Effect Gear-Tooth Sensors-Zero Speed," 2003.

Allegro Microsystems, "A1391-2-3-5 Data Sheet Micro Power 3V Linear Hall Effect Sensor Ics with Tri-State Output and User-Selectable Sleep Mode," 2005, pp. 1-16.

Bilotti et al., "Monolithic Magnetic Hall Sensor ICs Using Dynamic Quadrature Offset Cancellation," Allegro Microsystems, 1997, pp. 1-9.

Moghimi, Reza, "Zero-Drift Operational Amplifiers," AnalogDialogue, 2018, pp. 1-7.

Aug. 16, 2019 Search Report issued in British Patent Application No. 1902306.8.

May 20, 2019 Extended Search Report issued in European Patent Application No. 18210257.4.

Mar. 10, 2020 International Search Report issued in International Patent Application No. PCT/GB2019/053407.

Mar. 10, 2020 Written Opinion of the International Searching Authority issued in International Patent Application No. PCT/GB2019/053407.

* cited by examiner

ENCODER APPARATUS

The present invention relates to an improved encoder apparatus, in particular an improved readhead for an encoder apparatus.

The present invention relates to a scale reading apparatus of the type including a scale defined by a series of periodically arranged features, and a readhead movable relative to the scale. In one type of such apparatus, the readhead includes a light source which illuminates the scale, and at least one sensor for detecting light from the scale (e.g. reflected or transmitted by the scale) in order to determine relative motion between the scale and readhead and output at least one signal dependent thereon. For example, the light from the scale might form a resultant field on the sensor, which changes with relative movement of the scale and readhead. Such a pattern could be a modulated spot pattern (e.g. one or more spots which modulate in intensity with relative movement) or a pattern, e.g. a fringe pattern, such as an interference fringe pattern. One or more optical components might be located in the readhead in order to aid formation of the pattern on the sensor, e.g. one or more diffraction gratings. The sensor typically comprises a plurality of photodetecting elements upon which the light from the scale is incident. Typically, some form of periodic signal is generated when relative movement between the measurement scale and readhead takes place. This signal can be counted and the displacement between the scale and readhead can be determined. Such counting can take place within or outside of the readhead (e.g. the readhead could output the periodic signals and/or the readhead can output a count of said periodic signal).

In particular, it is known for the sensor to provide a plurality of phase-shifted cyclically modulating electrical signals corresponding to change in the signal with relative movement. It is common for two phase-shifted signals to be generated, for example which are phase-shifted by 90°. They are often called quadrature signals, and are commonly labelled and SINE and COSINE signals. Again, devices of this type usually function in an incremental fashion. The quadrature signals often serve as a basis for generating a total on a counter, indicative of the relative displacement of the scale and readhead. The total on the counter is either increased or reduced in correspondence with the number of quadrature signal cycles received, and the order in which these signals arrive at the counter.

It is known to provide one or more reference marks for defining a reference/datum position on the scale, and the readhead can have one or more sensors for detecting the reference mark. A reference mark may allow for the verification of the accuracy of the incremental count, and/or for determining a reference position of the readhead relative to the scale, for example when incremental count has been lost (e.g. due to a power failure) or is inaccurately made due to factors like too fast a travel of the readhead, or dirt on the scale. Accordingly, for example, the reference mark can be used, to reset an incremental counter. Accordingly, a reference mark and the reference mark signal generated therefrom, should uniquely identify one period of the incremental scale (and should be repeatable at least in one direction).

It is common for optical incremental encoder apparatus to use an optical reference mark, and for magnetic incremental encoders to use a magnetic reference mark, Examples of optical incremental encoder apparatus with optical reference marks include the TONiC™ and ATOM™ encoders available from Renishaw plc, and for example as described in WO2005/124282 and WO2015/049173. Examples of magnetic incremental encoder apparatus with magnetic reference marks include the LM10 encoder available from RLS merilna tehnika d.o.o.

However, it is also known for an optical incremental encoder apparatus to use a magnetic reference mark. Examples of optical incremental encoder apparatus with magnetic reference marks include the RG2 and RG4 incremental encoders available from Renishaw plc, and for example as described in EP0826138.

It is known to use two separate sensors, offset laterally in the measuring direction, to sense a reference mark, wherein the signals from the two sensors are combined to obtain a resultant signal (e.g. a difference signal) from which the reference mark signal is generated.

Sometimes a scale comes with a plurality of preformed reference marks, in which case one or more of them can be selected as an active reference mark by the end user placing a selector next to the reference mark which is to be used. For example, the TONiC encoder available from Renishaw plc has a plurality of preformed optical reference marks, and a user can select which of these is to be used as an active reference mark by placing a magnetic selector next to it. It is known for such a readhead to comprise a Hall sensor (in particular a chopper-based analogue Hall sensor) for detecting the selector which it uses to know that the next reference mark it detects, is the user selected one. Accordingly, the selector and its sensor identify a coarse region on the scale.

It is also known to provide one or more limit marks on a scale. Such limit marks are used on linear scales to define the end of travel of the machine on which the scale is mounted. It is known for such limit marks to be magnetic (for example), and sensors (separate to the incremental and reference mark sensors) can be used to detect when the readhead is over a limit mark. It is known for readheads to comprise one or more Hall sensors (in particular, one or more chopper-based analogue Hall sensors) and to output a signal when a limit mark is detected. The signal can be sent to the machine's controller to indicate that it has reached the end of travel and immediate corrective action should be taken. In contrast to a reference mark, a limit mark signal is independent of the incremental signals, and the limit mark is not used to verify or reset an incremental count—rather it is merely used to act as a warning when the machine reaches its end of travel. Accordingly, the accuracy and repeatability of a limit marks is not as important as a reference mark.

The present invention relates to optical encoder apparatus of the type which use a magnetic reference mark.

According to a first aspect of the invention there is provided an incremental encoder apparatus comprising a scale and a readhead. The scale can comprise a series of periodic features defining an optical incremental scale, and at least one magnetic reference mark. The readhead can comprise at least one incremental sensor configured to detect light from the optical incremental scale and output at least one signal dependent thereon. The readhead can also comprise at least two analogue Hall sensors. As will be understood, each analogue Hall sensor will be arranged to sense the at least one magnetic reference mark on the scale as at least one magnetic reference mark passes the readhead. Each analogue Hall sensor can comprise at least two output terminal pairs, and can each be configured to switch repeatedly between each output terminal pair so as to reduce any inherent offset in the output of the analogue Hall sensor. The apparatus can be configured to determine the presence of the reference mark from the outputs of the at least two analogue Hall sensors.

The present invention thus provides for using at least a pair of a sensors of a particular type for detecting the reference mark, and for generating a reference mark signal therefrom. The analogue Hall sensors could comprise a CMOS (Complementary Metal Oxide Semiconductor) sensor. The apparatus could comprise circuitry (e.g. "reference mark circuitry") configured to determine the presence of the reference mark from the outputs of the at least two analogue Hall sensors. All, part, or none of the circuitry could be located within the readhead. For example, a separate unit, such as an interface or controller could comprise all, or part of the circuitry. Accordingly, for example, the readhead and/or a separate unit (such as an interface or controller) could be configured to determine the presence of the reference mark/generate a reference mark signal, from the outputs of the at least two analogue Hall sensors.

As will be understood, said light from the optical incremental scale could change/modulate in response to relative movement of the readhead and scale. For example, the incremental sensor could be configured to detect one or more spots of light which modulate with relative movement of the scale and readhead.

Optionally, the incremental sensor is configured to detect a pattern or light, for example a fringe (e.g. an interference fringe) which changes (e.g. moves) with relative movement of the scale and readhead. The readhead could comprise a light source for illuminating the incremental scale. Accordingly, the apparatus could be configured such that light from the light source interacts with the scale so as to produce at the incremental sensor a resultant field (e.g. one or more modulated spots, a pattern of light, for example a fringe).

The readhead can comprise one or more gratings (e.g. diffraction gratings). For example, the one or more (diffraction) gratings can interact with light heading towards/from the scale so as to produce said (interference) fringe. Optionally, the readhead comprises a (diffraction) grating configured to interact with light leaving the scale so as to produce a resultant field (e.g. fringe, for instance an interference fringe). Optionally, the scale comprises a series of features configured to diffract light. Optionally, the resultant field is produced by the recombination of diffracted orders of light from the scale and diffraction grating (and optionally in that order). Accordingly, optionally there is no (diffraction) grating in the optical path before the scale. As will be understood, the readhead does not necessarily need to comprise a (diffraction) grating.

The incremental sensor could comprise an array of sensor elements. The incremental sensor could be configured such that the array extends in the measuring direction. Optionally, the incremental sensor comprises an electrograting comprising two or more sets of interdigitated/interleaved sensor elements, each set being configured to detect a different phase of the resultant field (e.g. the fringe, for example the interference fringe). Each set could be referred to as a channel.

As will be understood, references to light herein refer to visible as well as non-visible light. Accordingly, references to light herein is to electromagnetic radiation (EMR) anywhere in the ultra-violet to infra-red range (inclusive). As will be understood, the choice of a suitable wavelength for the light can depend on many factors, including the availability of suitable gratings and detectors that work at the EMR.

Optionally, the apparatus (e.g. the circuitry) is configured to determine a difference signal which is proportional to the difference of the outputs of the two analogue Hall sensors. Accordingly, the apparatus could be configured to determine the presence of the reference mark/generate a reference mark signal, from the difference of the outputs of the two analogue Hall sensors. The difference signal could be an analogue or digital signal. The apparatus (e.g. the circuitry) could be configured to differentially amplify the outputs of the analogue Hall sensors to obtain said difference signal. Accordingly, the apparatus (e.g. the circuitry) could comprise a differential amplifier for differentially amplifying the outputs of the analogue Hall sensors to obtain said difference signal.

Optionally, the apparatus (e.g. the circuitry) is configured to at least partially filter noise caused by said switching between the output terminal pairs, e.g. so as to filter noise present in the signals output from the analogue Hall sensor. For example, the apparatus (e.g. the circuitry) could be configured to at least partially filter noise having a frequency at which the switching occurs (and optionally at harmonics thereof). Optionally, the apparatus (e.g. the circuitry) could be configured to filter noise caused by said switching between the output terminal pairs, such that noise at the frequency at which switching occurs (and optionally at harmonics thereof) is reduced by at least 25%, for instance by at least 40%, for example by at least 60%, for example by approximately 75%. This can be particularly useful in reducing noise in any difference signal obtained from the analogue Hall sensors. This in turn can be useful in improving the repeatability of the reference mark, in particular its accuracy. Accordingly, optionally, the apparatus (e.g. the circuitry) is configured to filter noise present in the signals output from the analogue Hall sensor, such that noise present in the signals output from the analogue Hall sensor at the frequency at which switching occurs (and optionally at harmonics thereof) is reduced by at least 25%, for instance by at least 40%, for example by at least 60%, for instance by approximately 75%.

Optionally, the apparatus (e.g. the circuitry) is configured to filter noise, such that noise in a differential signal determined from the at least two analogue Hall sensors, at the frequency at which switching occurs(and optionally at harmonics thereof), is reduced by at least 25%, for instance by at least 40%, for example by at least 60%, for instance by approximately 75%. As will be understood, the apparatus (e.g. the circuitry) could comprise a filter (e.g. a filter arrangement, such as filter circuitry) configured to effect any or all of the above, e.g. the apparatus could comprise a filter (arrangement/circuitry) configured to at least partially filter noise caused by said switching between the output terminal pairs.

Optionally, the apparatus comprises a multi-pole (or multi-order) filter (arrangement/circuitry) configured to filter noise present in the output of the analogue Hall sensor. Such a multi-pole filter (arrangement/circuitry) could comprise one or more multi-pole filters. Optionally, such a multi-pole filter (arrangement/circuitry) could comprise a plurality of single-pole filters (e.g. at least first and second single-pole filters). Preferably, the break-point frequency (also known as "break frequency" or "cut-off frequency") of each of the "poles" is within the same order of magnitude. Accordingly, preferably the ratio of the highest and lowest break-point frequencies of the poles is not more than 10:1, for example not more than 5:1, for instance not more than 3:1, optionally not more than 2:1, and for example are approximately 1:1. Such filters could be low-pass filters.

Accordingly, for example, the multi-pole filter (arrangement/circuitry) could comprise at least first and second single-pole low-pass filters (e.g. configured to filter noise present in the output of the analogue Hall sensor).

The apparatus (e.g. the circuitry) can be configured to generate (e.g. output) a reference mark signal when it has determined the presence of the reference mark. Optionally, the apparatus is configured to reset an incremental count in response to the presence of the reference mark being determined (e.g. in response to a reference mark signal).

The apparatus (e.g. the circuitry) can be configured to determine the presence of the reference mark when the difference signal crosses a predetermined threshold. For example, the apparatus (e.g. the circuitry) could comprise a device for comparing (e.g. a comparator), which could be configured to generate (e.g. output) a reference mark signal when it determines that the difference signal has crossed a predetermined threshold In order to function as a useful reference mark, it is important that the reference mark detection process is repeatable, at least to one period of the incremental scale, so that the reference mark is always detected in the same position relative to the incremental features, at least in one direction of motion. If this is not the case, then the reference mark will not uniquely identify the same incremental position each time the readhead passes over the reference mark. This can cause repeatability problems, in particular position offset problems, in machines which are relying on the position reported by the encoder apparatus.

Preferably, the reference mark signal is repeatable to one period of the incremental scale, in at least one direction of travel. The apparatus (e.g. the readhead) could be configured to generate at least one periodic incremental signal (and optionally a pair of phase-offset periodic incremental signals). Optionally, the reference mark signal is repeatable to 1 signal period, optionally ½ signal period, for example to ¼ signal period.

The magnetic reference mark can be much bigger than the incremental features. Optionally, the ratio of the extent of the magnetic reference mark (i.e. the extent of the magnet) in the measuring dimension, to the incremental scale period is at least 50:1, optionally at least 75:1, for example at least 100:1. The invention can be particularly useful with fine pitch incremental scale. Optionally, the period of the incremental scale is not greater than 100 μm (microns), for example not greater than 60 μm, optionally not greater than 50 μm, for instance not greater than 40 μm. Optionally, the extent of the magnetic reference mark (i.e. the extent of the magnet) in the measuring dimension is at least 0.5 mm (millimetre), for example at least 1 mm.

Optionally, the reference mark signal is repeatable to one period of the incremental scale, for example repeatable to 1 incremental signal period (and for instance to ½ or even to ¼ incremental signal period), up to relative velocity of the scale and readhead of 0.125 m/s (metres per second) (in particular for an incremental scale period of 20 μm), for example up to 0.25 m/s (in particular for an incremental scale period of 40 μm).

The apparatus can comprise means for applying a positive phase shift to the outputs of the chopper-based Hall sensors. For example, a filter (arrangement/circuitry) can comprise a zero configured to produce a positive phase shift in the filter. As explained in more detail below, this can help to (in other words, the zero can be configured to) at least partially cancel out the effect of the negative phase shift from the analogue Hall sensors. This can help to produce a reference mark output that has significantly better repeatability and at higher operating speeds. For example, such an arrangement can enable the reference mark signal to be repeatable to one period of the incremental scale, for example repeatable to 1 incremental signal period (and for instance to ½ or even to ¼ incremental signal period), up to relative velocity of the scale and readhead of 0.250 m/s (metres per second) (in particular for an incremental scale period of 20 μm), for example up to 0.5 m/s (in particular for an incremental scale period of 40 μm).

Embodiments of the invention will now be described, by way of example only, with reference to the following drawings in which.

Figure 1:
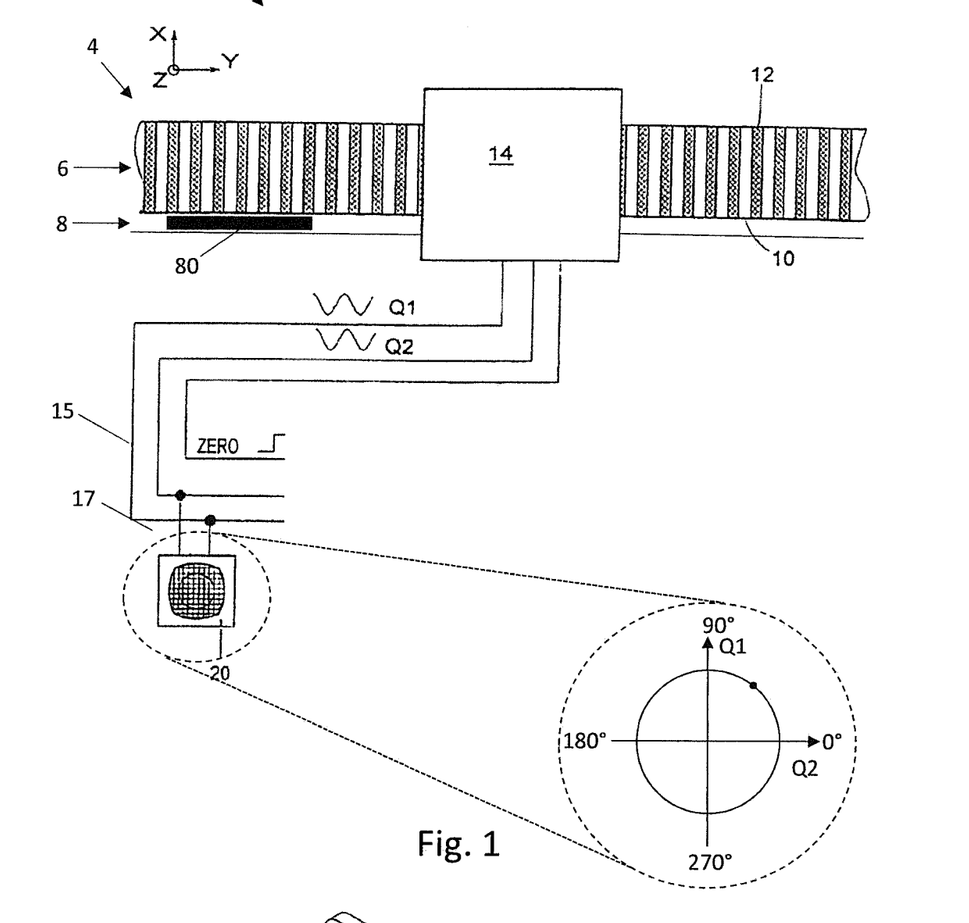
FIG. 1 is an overview diagram of an encoder according to the present invention.
Figure 2:
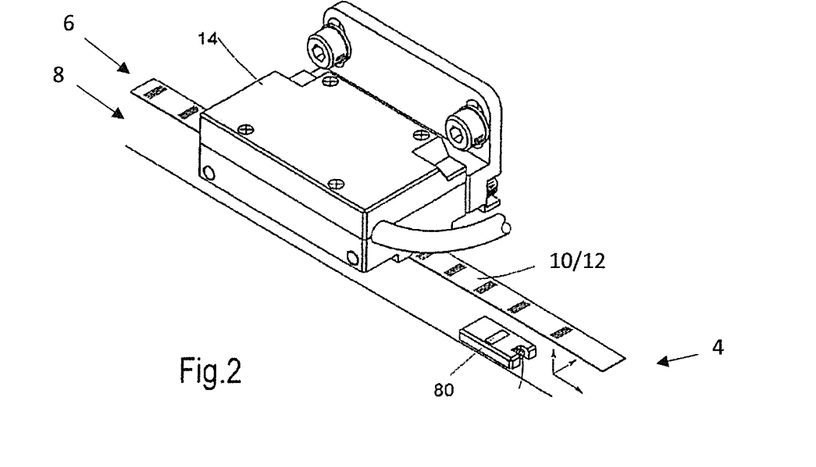
FIG. 2 is a perspective view of the scale and readhead of the encoder of FIG. 1

With reference to FIGS. 1 and 2, an incremental optical encoder 2 comprises a scale 4 and a readhead 14. The scale 4 comprises an optical incremental track 6 and a magnetic reference mark track 8. The optical incremental track comprises a series of alternately spaced light reflective 10 and non-reflective 12 lines, extending in the x-direction, and spaced apart in the y-direction. The magnetic reference mark track 8 comprises at least one magnetic feature 80 forming a magnetic reference mark. As will be understood, the depicted relative sizes of the incremental features and the magnetic reference mark is schematic for ease of illustration purposes. For example, whilst it can be desirable for the reference mark to be as small as possible, practically the reference mark has to be sufficiently large to enable the reference mark detector arrangement to reliably detect the reference mark. Accordingly, especially when magnetic reference marks are used in combination with high resolution optical incremental scales, the ratio of the extent of the reference mark to the period of the incremental scale features can be quite large, for example 50:1 or higher.

The readhead 14, mounted in register with the scale 4 and offset therefrom in the z-direction, is movable relative to the scale 4 in the y-direction. The readhead 14 includes a light source (not shown) directing light toward the scale 4 which, in conjunction with light reflected from the scale 4 (and optionally one or more optical components within the readhead, such as gratings, e.g. diffraction gratings), generate a periodic light pattern in the readhead 14. Relative movement of the scale 4 and readhead 14 results in a corresponding cyclic change in a resultant field, and thereby a cyclically varying light intensity modulation (e.g. movement of the periodic light pattern such as a fringe, for example an interference fringe). A plurality of photodetectors in the readhead, generate a plurality of electrical signals corresponding to the modulating light intensity. These electrical signals are combined to generate a pair of sinusoidally varying signals Q1, Q2, having a quadrature relationship, which are outputs of respective incremental signal lines 15 and 17. Possible optical configurations for the readhead, and the generation of signals Q1, Q2 is known per se from e.g. GB1504691, WO86/03833, WO87/07944, WO01/63215, and WO2017/042570.

Figure 3:
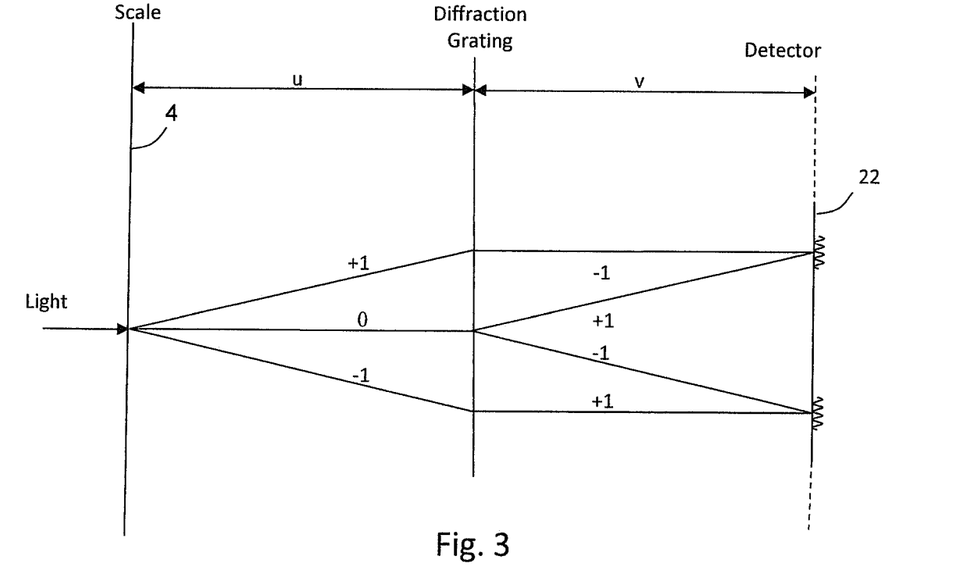
FIGS. 3 and 4 illustrate the generation of an interference fringe.
Figure 4:
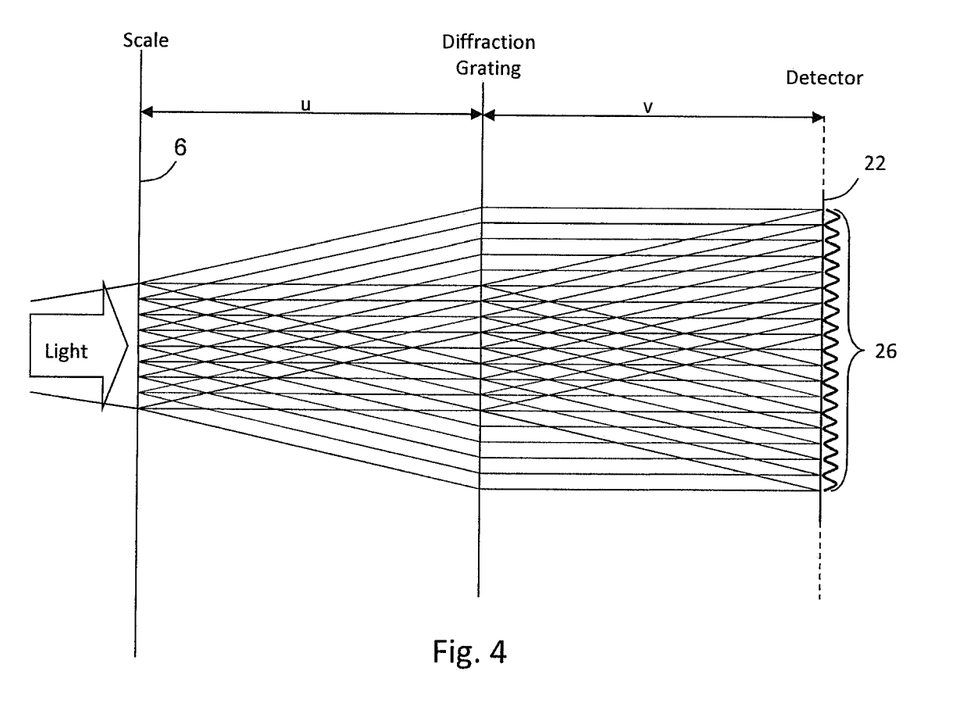

For instance, the readhead 14 might include a diffraction grating located so as to interact with light from the scale to produce an interference fringe at a detector in the readhead. An example of how an interference fringe could be generated is explained in more detail with reference to FIGS. 3 and 4. As will be understood, FIG. 3 is a very simplified illustration of the actual optical situation encountered in an encoder apparatus. In particular, in FIG. 3 only one light ray from the source is illustrated whereas in fact an area of the incremental track 6 is illuminated by the light source. Accordingly, in reality the optical situation shown in FIG. 3 is repeated many times over along the length of the scale (i.e. over the area that is illuminated by the source), hence producing a long interference pattern at the detector, which is schematically illustrated in FIG. 4. Also, for illustrative purposes only the +/−$1^{st}$ orders are shown (e.g. as will be understood the light will be diffracted into multiple orders, e.g. +/−$3^{rd}$, +/−$5^{th}$, etc diffraction orders). The light is diffracted by the series of periodic features 10, 12 in the incremental track 6 of the scale 4, and the diffraction orders propagate toward the diffraction grating where the light is diffracted again before forming a resultant field (in this case an interference fringe, but could for example be modulated spot(s)) at the incremental detector. As shown in FIG. 4, the resultant field (in this case the interference fringe) 26 is produced by the recombination of diffracted orders of light from the diffraction grating and scale 4.

For the sake of simplicity of illustration the ray diagrams in FIGS. 3 and 4 are shown as transmissive ray diagrams (that is the light is shown as being transmitted through each of the scale and index grating), whereas in reality at least one of these could be reflective. For example, the rays could be reflected by the scale 6 as described above in connection with FIGS. 1 and 2.

The incremental detector 22 detects the interference fringe 26 to produce a signal which is output by the readhead 14 to an external device such as the interface 30.

In particular, relative movement of the readhead 14 and scale 4 causes movement of the interference fringes 26 relative to the incremental detector, the output of which can be processed to provide an incremental up/down count which enables an incremental measurement of displacement. For instance, as mentioned above, the readhead 14 can provide two signals in quadrature (that are 90 degrees out of phase from each other), and are commonly labelled as SIN and COS signals (even though they may not actually be sine or cosine signals), and in this case are labelled Q1 and Q2. If desired, the quadrature signals can be interpolated to provide an accurate measurement of the position of the readhead to less than one period of the repeating scale pattern. The provision of such quadrature signals by an encoder apparatus is well known in order to provide an indication of direction as well as relative movement of the readhead and scale.

Figure 5:
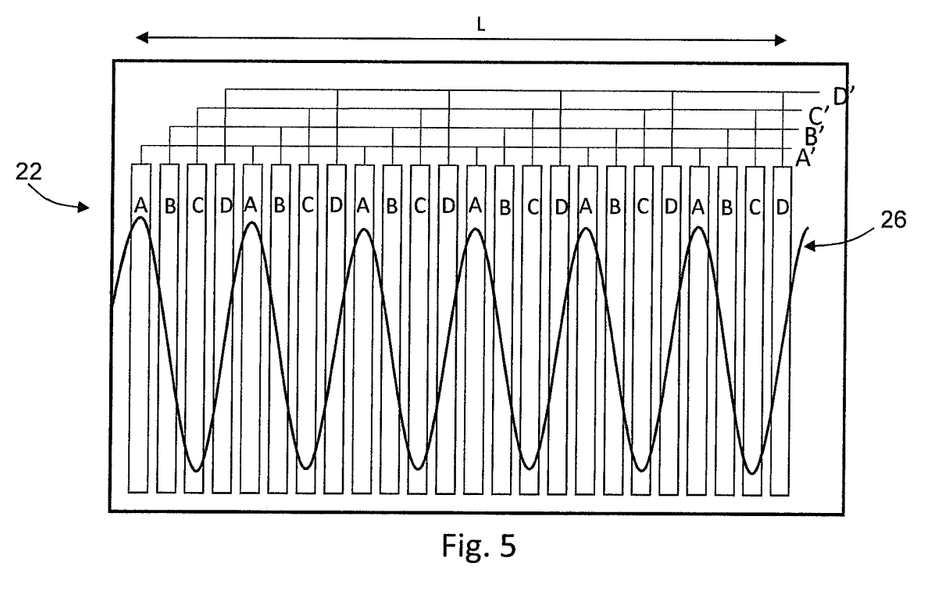
FIG. 5 illustrates the intensity profile of an interference fringe falling on an incremental photodetector.

In the embodiment described, the incremental detector 22 is in the form of an electrograting, which in other words is a photo-sensor array which comprises two or more sets of interdigitated/interlaced/interleaved photo-sensitive sensor elements (also referred to herein as "photodetectors" or "fingers"). Each set can, for example, detect a different phase of the interference fringe 26 at the detector 22. An example of an electrograting is illustrated in FIG. 5, in which a part of an incremental detector 22 is shown, and in which the fingers/photodiodes of four sets of photodiodes (A, B, C and D) are interdigitated/interleaved to form an array of sensor elements extending along the length "L" of the sensor. The sets of photodiodes are arranged in a repeating arrangement, having a period "p" (and hence a frequency "f" being 1/"p"). The intensity of the interference fringe as it falls on the detector 22 is schematically illustrated by the line 26.

As shown, in the embodiment described, the individual fingers/photodiodes/sensor elements extend substantially perpendicular to the length L of the incremental detector 22. Also, the individual fingers/photodiodes/sensor elements are substantially rectangular in shape. As will be understood, the invention is also applicable to other shaped and arranged sensor elements.

The output from each finger/photodiode in a set is combined to provide a single output, thereby resulting in four channel outputs: A', B', C' and D'. These outputs are then used to obtain the quadrature signals Q1, Q2 (or SIN, COS). In particular, A'-C' is used to provide a first signal (Q1) and B'-D' is used to provide a second signal (Q2) which is 90 degrees out of phase from the first signal. Although in the specific embodiment the electrograting comprises four sets of photodiodes providing four the channels A', B', C' and D', this need not necessarily be the case. For example, the electrograting could comprise two sets of photodiodes providing just two channels A' and B'.

The quadrature signals Q1, Q2 form the basis of an incremental count corresponding to the displacement of the readhead 14 relative to a reference position on the scale 10. Further, if desired, It is possible to resolve the movement of the readhead 14 relative to the scale 10 to within a fraction of a single cycle of the quadrature signals Q1, Q2; the signals Q1, Q2 may be thought of as generating a circular Lissajous FIG. 20 when viewed one against the other, with a single cycle of quadrature signals corresponding to one rotation about the circle. Sub-cycle resolution may thus be achieved by dividing the circle into an equal number of segments.

Figure 6:
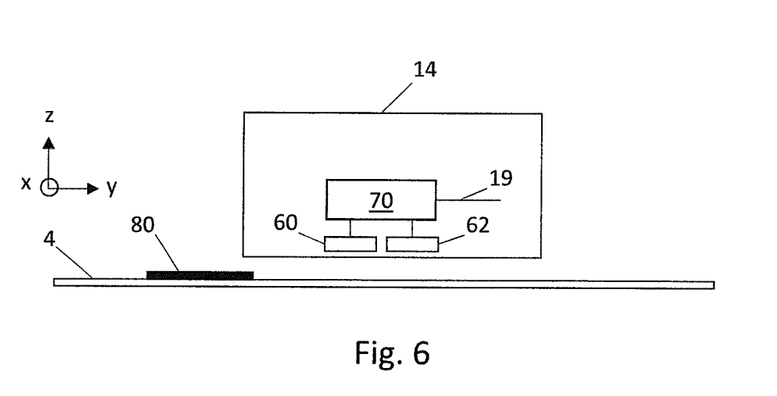
FIG. 6 illustrates the reference mark detectors and processing circuitry within the readhead.

Attention will now turn to the readhead's magnetic reference mark detector arrangement. As illustrated in FIG. 6, the readhead's 14 magnetic reference mark detector arrangement comprises two individual magnetic reference mark sensors 60, 62 which each output a signal which changes when they pass over the reference mark 80. The signals are received by reference mark circuitry 70 which processes the output of the sensors 60, 62 in order to detect the presence of the reference mark and output a reference mark signal on output 19 to downstream electronics. This reference mark signal could be used in various ways. For example, the raw reference mark signal output from circuity 70 could be used as the datum signal for verifying the incremental count. Optionally, the reference mark signal output from circuitry 70 could be used in a subsequent process for determining the datum signal. For instance, the reference mark signal output from circuitry 70 could be used as (or to generate) a gate signal for selecting one of a series of pre-generated datum signals which occur at the same phase position once every cycle of an interpolated incremental signal (e.g. as described in more detail in WO2017203210). Either way, the reference mark signal is repeatable to a single scale period.

Figure 7A:
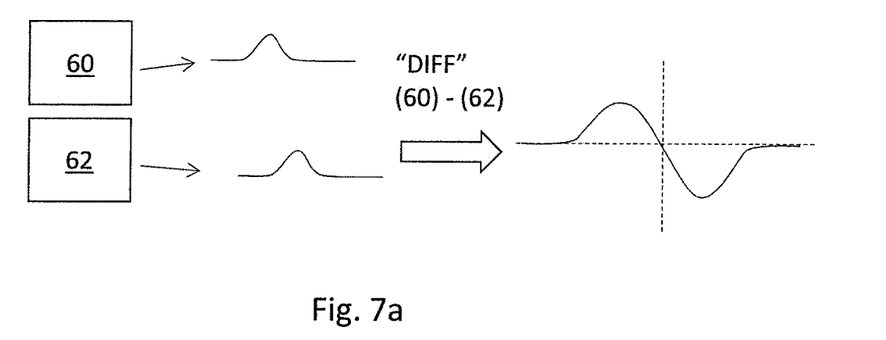
FIGS. 7*a* and 7*b* illustrate signal pulses output from the sensors used to detect the reference mark, a difference signal generated therefrom, and its relationship with respect to the incremental signals.
Figure 7B:
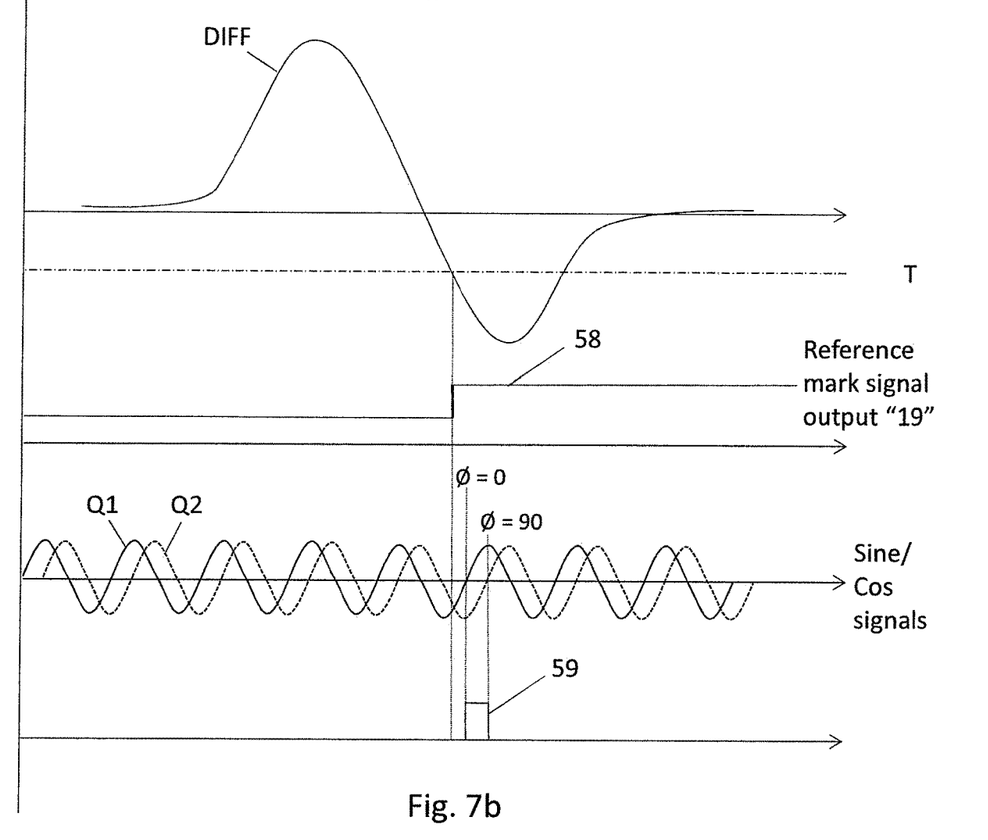

An overview of how the circuitry 70 generates the reference mark signal will now be provided with reference to FIGS. 7a and 7b. As schematically illustrated in FIG. 7a, when each of the reference mark sensors 60, 62 pass the reference mark 80, their output changes (in this case, rises and then falls to provide a signal spike). Because the reference mark sensors 60, 62 are offset in the measuring direction, the spike/pulse in signal reported by one of the sensors lags behind the other. Their outputs are combined to determine a difference signal ("DIFF"), wherein DIFF=the output of sensor 60 minus the output of sensor 62. As shown in FIG. 7b, one way of determining the presence of the reference mark is to determine when the DIFF signal passes a threshold T level (as will be understood, a different threshold may be used for determining the reference mark when the readhead is moving in the other direction). The occurrence of this event can be signalled to downstream electronics by changing the voltage on the output 19 (e.g. from low to high as schematically illustrated by line 58 in FIG. 7b). When the downstream electronics (which may or may not be within the readhead 14) (e.g. an interpolator/interface) receives said transition on the voltage on the output 19, it then can use the reference mark signal as desired. For example, in one embodiment it can cause a reference mark gating signal to be generated the next time the Lissajous of the Q1 and Q2 signals is between 0° and 90° (as schematically illustrated by the gating signal 59 in FIG. 7b). In an alternative embodiment, a pair of thresholds can be used, and the reference mark signal could comprise pulling the voltage on the output 19 high (or low) when the difference signal is between the pair of thresholds. Again, such a signal could itself be output to a controller as a reference mark signal, or it could be used in other ways; for example, to gate one of a series of pre-generated datum signals which occur at the same phase position once every cycle of an interpolated incremental signal.

Figure 8A:
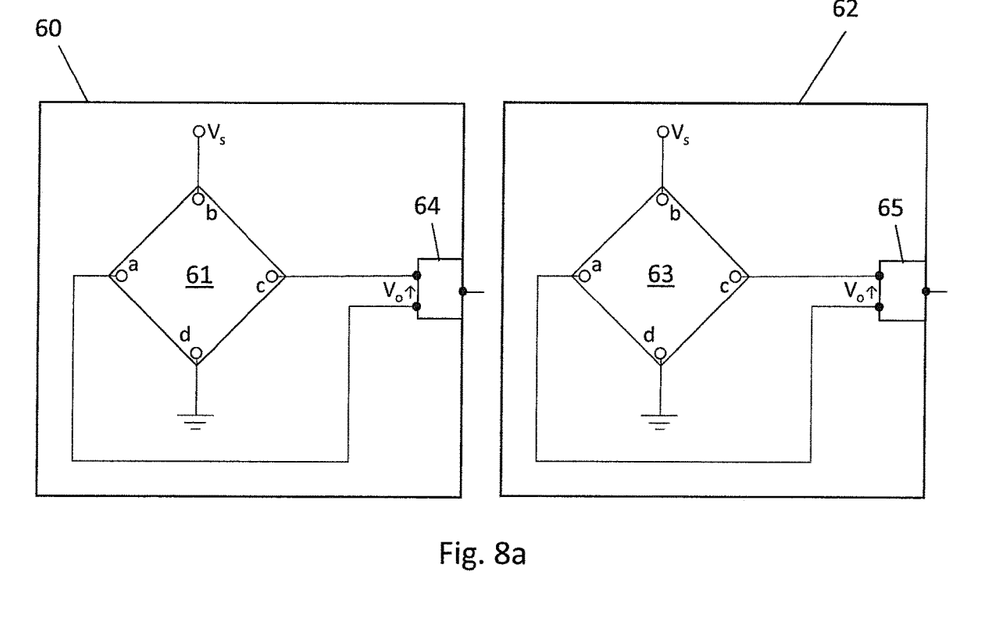
FIGS. 8*a* and 8*b* illustrate the sensors used for detecting the magnetic reference mark in more detail.
Figure 8B:
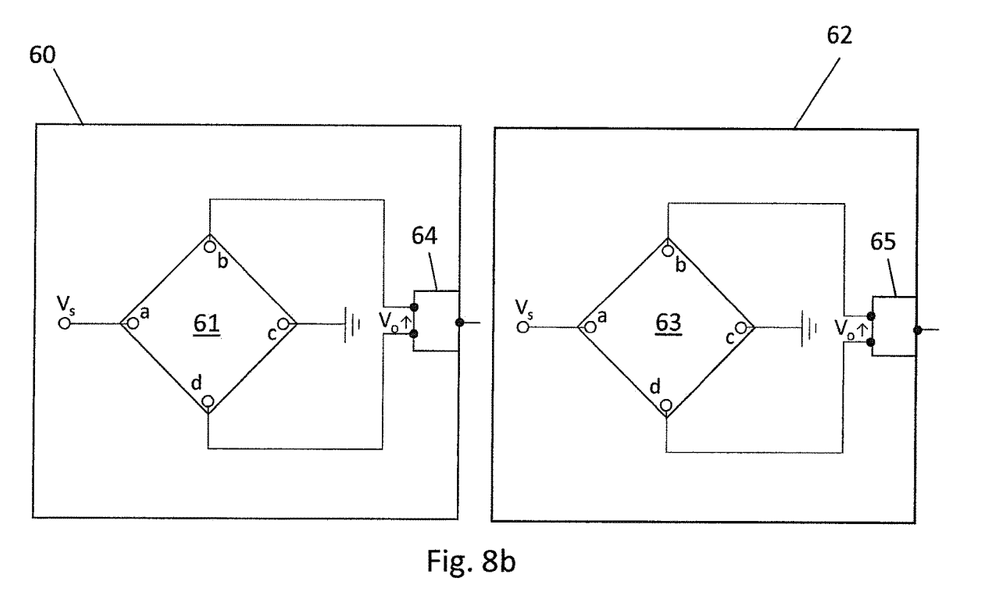

As shown in FIG. 8a, each reference mark sensor 60, 62, comprises an analogue Hall sensor 61, 63, and processor/circuitry 64, 65 configured to process the output of the Hall sensor in order to provide a signal proportional to the magnetic field across the Hall sensor. Each analogue Hall sensor has four terminals, a, b, c and d. When the analogue Hall sensor passes over the reference mark 80, there is a change in the voltage across the Hall sensor, Accordingly, the voltage across a diametrically opposed pair of terminals (e.g. a & c) can be monitored to determine the presence of the reference mark. However, in order to minimise the adverse effects of offset voltages, and drift (e.g. due to temperature variations, strain, etc), it is known to periodically switch between the pairs of the analogue Hall sensor used for the supply and output. For example, as shown in FIG. 8a, terminal pair a and c is used for the output and terminal pair b and d are used for the supply, but this can be switched such that, as shown in FIG. 8b, terminal pair a and c is used for the supply and terminal pair b and d are used for the output. The frequency of such switching is typically at least 50 kHz, is normally in the order of hundreds of kHz, and for example in this embodiment is approximately 200 kHz. Such chopper-based analogue Hall sensors are known, and for example are available from Allegro MicroSystems L.L.C and are described, for instance, in their patent U.S. Pat. No. 5,621,319.

As will be understood, in order for a reference mark to function as a good reference mark, it is important that the reference mark signal generated therefrom is always issued at the same point along the scale. In particular, it is desirable that the reference mark signal is repeatable to one unit resolution of the incremental system. For example, it is desirable for the reference mark signal to always be issued at the same count position. However, it has been found that this is difficult to achieve when using such chopper-based analogue Hall sensors. In particular, whilst such chopper-based analogue Hall sensors can be useful for minimising the adverse effects of any offset voltage and any drift issues, it has been found that the outputs of such sensors can be noisy due to the chopping/switching, and such "chopper/switching noise" can be sufficiently high so as affect the repeatability of the reference mark signal. This appears to be compounded by virtue of the reference mark signal being derived from the outputs of two chopper-based analogue Hall sensors, in particular being derived from the difference of the outputs of two chopper-based analogue Hall. This is because in some instances the chopper/switching noise constructively interferes and at other times destructively interferes, which in turn can significantly shift the position at which the OFF signal crosses the threshold.

Figure 9:
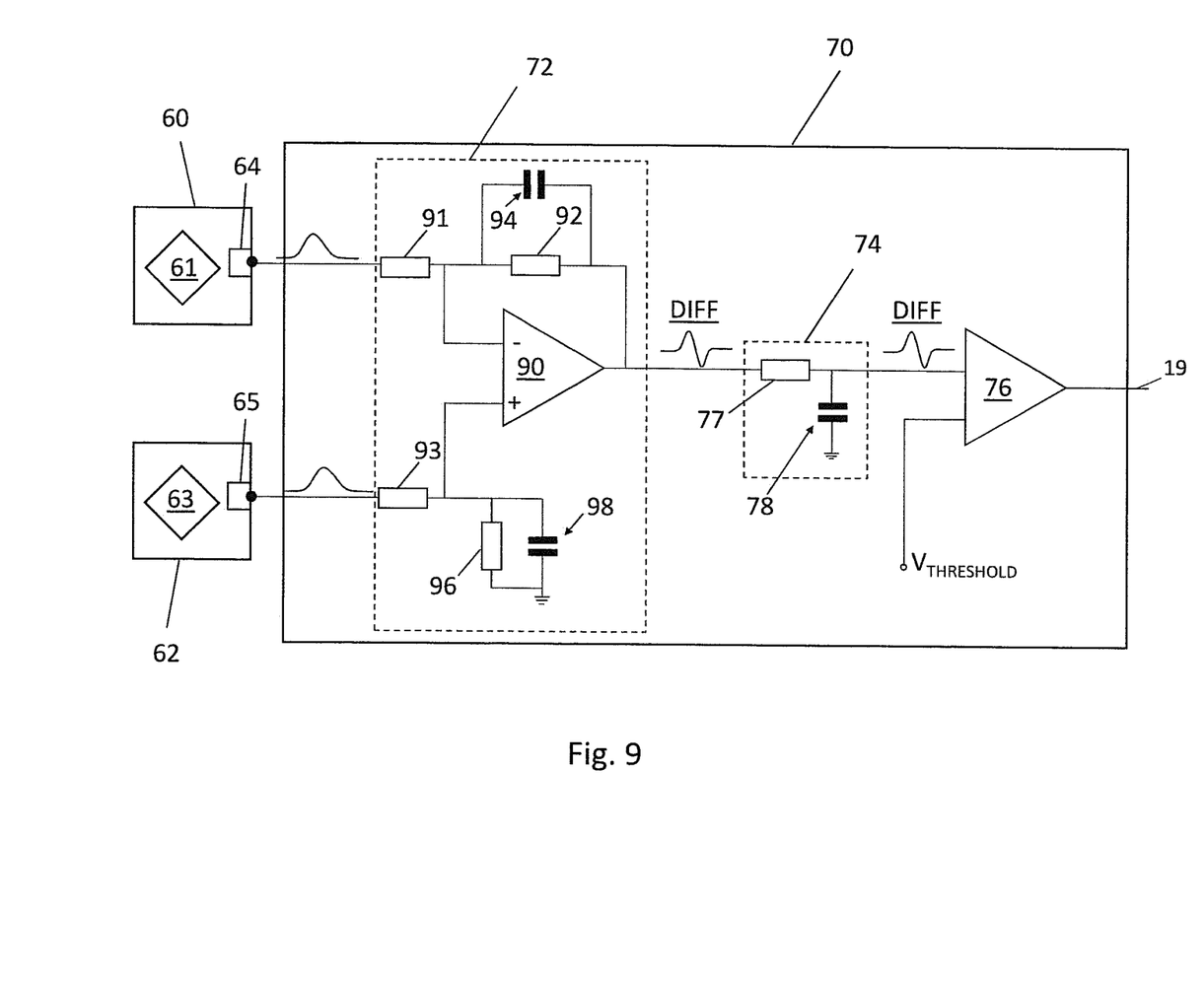
FIG. 9 illustrates circuitry according to one embodiment which can be used for processing the output of the sensors used for detecting the magnetic reference mark to determine the presence of the reference mark.

In instances in which such chopper/switching noise does adversely affect the repeatability of the reference mark signal, it has been found that the circuitry 70 can be configured to at least partially filter such chopper/switching noise, so as to thereby improve the repeatability of the reference mark signal. One such arrangement is illustrated in FIG. 9. Here, the circuitry 70 comprises a filtered differential amplifier 72, a further filter 74, and a comparator 76. The outputs from each of the reference mark sensors 60, 62 are fed to the filtered differential amplifier to obtain the DIFF signal. This DIFF signal is filtered by the filter 74 before being analysed by the comparator 76 to determine if it has passed the threshold T. If so, then the signal on output 19 is raised to indicate that the reference mark has been detected.

Figure 11A:
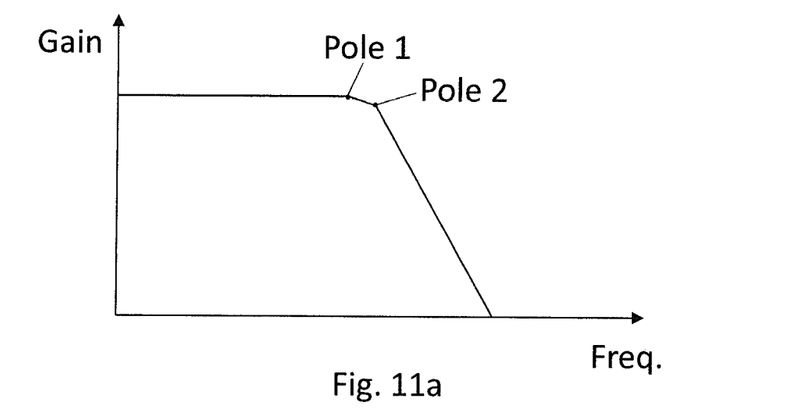
FIGS. 11*a* and 11*b* respectively schematically illustrate the gain frequency response (bode plots) of the circuitry of FIGS. 9 and 10.

As shown, in FIG. 9, the filtered differential amplifier 72 comprises "first" 91 and "second" 93 resistors, a differential amplifier 90 having inputs from the first 60 and second 62 chopper-based analogue Hall sensors, and also first and second RC (resistor-capacitor) filters, (the first RC filter comprising a "third" resistor 92 and a "first" capacitor 94 and the second RC filter comprising a "fourth" resistor 96 and a "second" capacitor 98). The ratio of the "third" resistor 92 to the "first" resistor 91 and the ratio of the "fourth" resistor 96 to the "second" resistor 9:3 sets the gain of the differential amplifier. The resistors 92, 96 and capacitors 94, 98 of the first and second RC filters are configured so as to act as a first single-pole low-pass filter. The combination of the "third" resistor 92 and the "first" capacitor 94, and of the "fourth" resistor 96 and the "second" capacitor "98" set the filter breakpoint. As also illustrated in FIG. 9, the RC filter 74 comprises a resistor 77 and a capacitor 78, configured so as to act as a second single-pole low-pass filter. Together, the first and second single-pole filters, effectively provide a multi-pole filter (arrangement/circuitry). The effect of these two poles on the gain of the differential amplifier 72 is schematically illustrated in FIG. 11a.

As will be understood, other ways of providing a multi-pole filter (arrangement/circuitry) include providing a single two-pole low-pass filter. Preferably, the break point (also known as the break frequency) of the poles is at least within an order of magnitude of each other, and ideally are substantially the same. The use of a multi-pole filter (arrangement/circuitry) has been found to be particularly beneficial in filtering out the chopper-noise because it helps to maximise the break point frequency so as to reduce circuit delay, so as to in turn maximise the speed at which the reference mark is repeatable. For example, the present inventors have found that even when using chopper-based Hall sensors, they are able to achieve repeatability of the reference mark up to speeds of 0.125 m/s (metres per second), in a system having an incremental scale pitch of 20 μm (microns) and with a magnetic reference mark having an extent of 2 mm (millimetres) in the measuring direction of the scale, and they are able to achieve repeatability of the reference mark up to speeds of 0.25 m/s, in a system having an incremental scale pitch of 40 μm (microns) and with a magnetic reference mark having an extent of 2 mm in the measuring direction of the scale.

The inventors found that the chopper-based analogue Hall sensors have an inherent operating bandwidth which introduces a negative phase shift into the Hall sensor outputs, which worsens with increasing operating speeds (of the readhead and scale). A negative phase shift is also introduced by the filtering arrangement of FIG. 9. This negative phase shift results in the position of the reference mark output shifting relative to the COS and SIN incremental signals. This can prevent the reference mark being repeatable to within one unit of resolution, especially at higher operating speeds.

Figure 10:
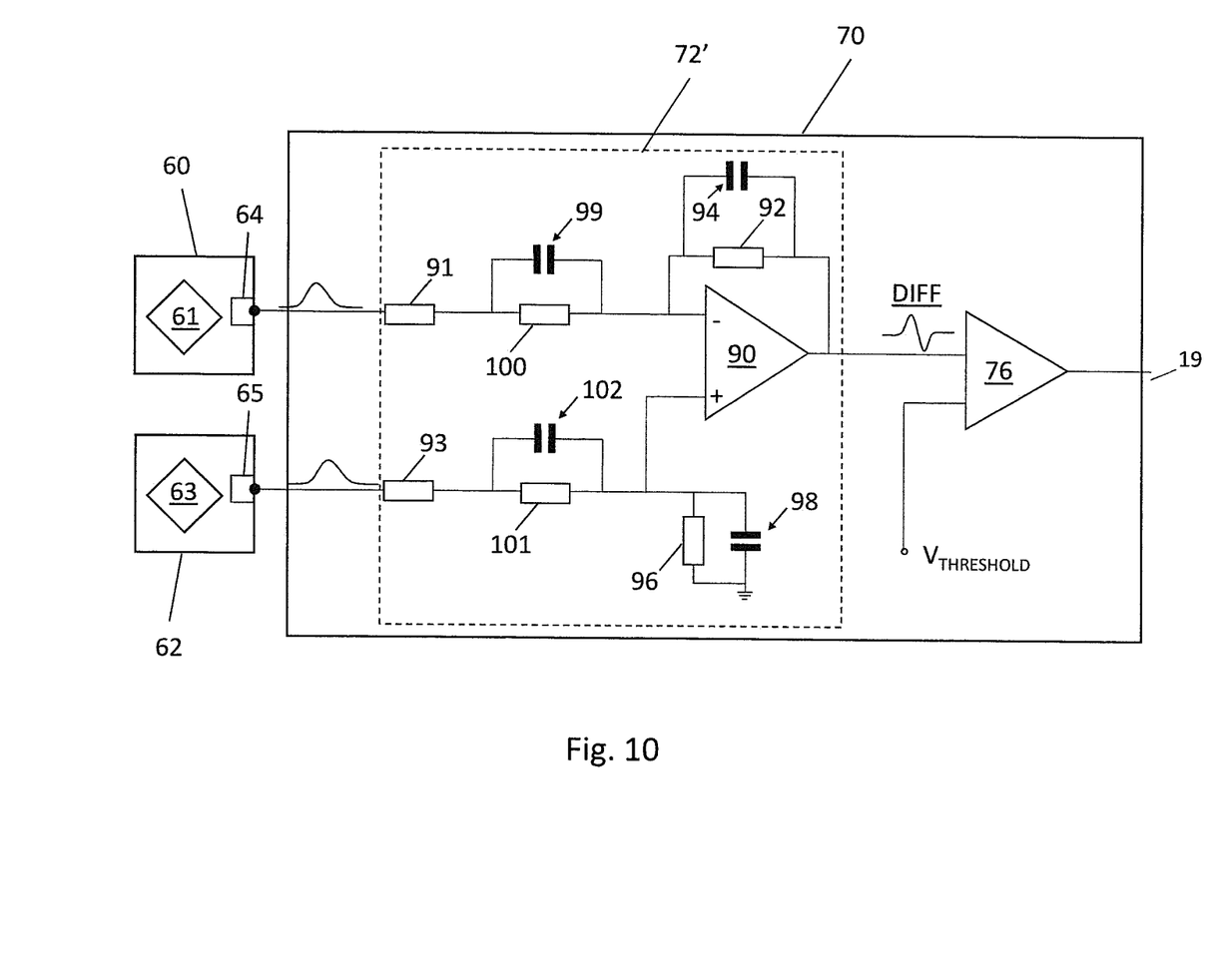
FIG. 10 illustrates circuitry according to another embodiment which can be used for processing the output of the sensors used for detecting the magnetic reference mark to determine the presence of the reference mark.

Referring to FIG. 10, there is shown a circuit, similar to that of FIG. 9 (and like parts share like reference numerals), but which has been configured to create a positive phase shift, so as to cancel out the effect of the negative phase shift from the analogue Hall sensors. This produces a reference mark output that has significantly better repeatability and higher operating speeds.

As shown, similar to the embodiment of FIG. 9, the circuit comprises first and second RC (resistor-capacitor) filters, (the first RC filter comprising the "third" resistor 92 and the "first" capacitor 94 and the second RC filter comprising the "fourth" resistor 96 and the "second" capacitor 98). These form the main low pass filter element and set the filter break point. In other words the resistors 92, 96 and capacitors 94, 98 of the first and second RC filters are configured so as to act as a single-pole low-pass filter.

Figure 11B:
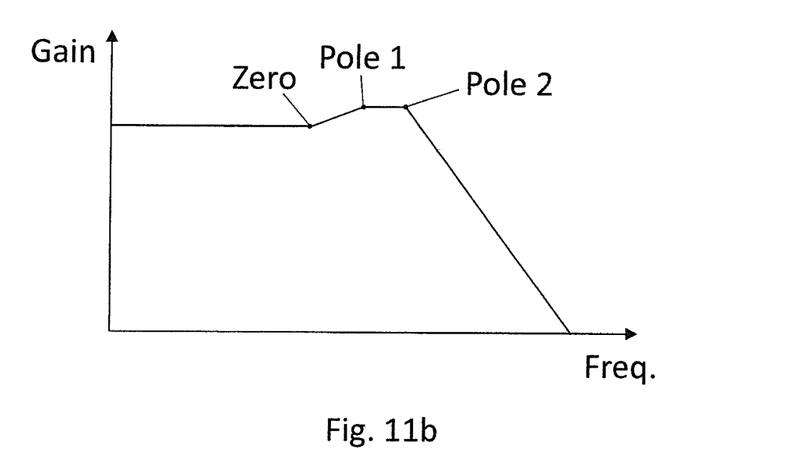

In contrast to the embodiment of FIG. 9, additional RC filters are located in-line between the analogue Hall sensors 60, 62 and the differential amplifier 90. In particular, as shown, one RC filter (comprising a resistor 100 and capacitor 99) is located in-line between the first analogue Hall sensor 60 and the differential amplifier 90. Also, another RC filter (comprising a resistor 101 and capacitor 102) is located in-line between the second analogue Hall sensor 62 and the differential amplifier 90. These additional RC-filters are configured to introduce a single zero and another pole into the system. The zero produces a positive phase shift in the filter, which cancels out the effect of the negative phase shift inherent to the Hall sensors and the filtering electronics. FIG. 11b schematically illustrates the effect the arrangement of FIG. 10 can have on the gain of the differential amplifier 72'. As shown, the gain rises at the zero, flattens off at the first pole, and drops at the second pole.

The ratio of the resistors 92 to (91+100) and also 96 to (93+101) set the DC gain of the differential amplifier.

It can be preferred that the resistance of resistors 91 and 93 are the same, the resistance of resistors 100 and 101 are the same, and the capacitance of capacitors 99 and 102 are the same, so that the effect on the outputs of the first 60 and second 62 Hall sensors are the same. However, as will be understood, this need not necessarily be the case.

As will be understood, the resistance of the resistors 91, 92, 93, 96, 100 and 101, and the capacitance of the capacitors 94, 98, 99 and 102, will be selected depending on the particular requirements of the encoder, and for instance on the desired zero and pole frequencies. For example, the pole frequencies for the arrangement of FIG. 9 (and FIG. 11a) can be determined as follows:

$$\text{Pole1 frequency (Hz)} = \frac{1}{2\pi \cdot C94 \cdot R92} = \frac{1}{2\pi \cdot C98 \cdot R96} \quad (1)$$

$$\text{Pole2 frequency (Hz)} = \frac{1}{2\pi \cdot C78 \cdot R77} \quad (2)$$

(where: C78=capacitor 78; C94=capacitor 94; C98=capacitor 98; R77=resistor 77; R92=resistor 92; R96=resistor 96).

Also, the zero and pole frequencies for the arrangement of FIG. 10 (and FIG. 11b) can be determined as follows:

$$\text{Zero frequency (Hz)} = \frac{1}{2\pi \cdot C99 \cdot R100} = \frac{1}{2\pi \cdot C102 \cdot R101} \quad (3)$$

$$\text{Pole1 frequency (Hz)} = \frac{1}{2\pi}\left(\frac{1}{C99 \cdot R100} + \frac{1}{C99 \cdot R91}\right) = \frac{1}{2\pi}\left(\frac{1}{C102 \cdot R101} + \frac{1}{C102 \cdot R93}\right) \quad (4)$$

$$\text{Pole2 frequency (Hz)} = \frac{1}{2\pi \cdot C94 \cdot R92} = \frac{1}{2\pi \cdot C98 \cdot R96} \quad (5)$$

(where: C94=capacitor 94; C98=capacitor 98; C99=capacitor 99; C102=, capacitor 102; R91=resistor 91; R92=resistor 92; R93=resistor 93; R96=resistor 96; R100=resistor 100; R101=resistor 101).

It should be noted that an advantage of the design of FIG. 10 is that the main low pass filter provided by the first and second RC (resistor-capacitor) filters can have a lower cut off frequency, thus filtering out more chopper noise compared to the design of FIG. 9, because the delay/phase shift can be compensated by the introduction of the zero into the filter (arrangement/circuitry).

In the embodiment of FIG. 10, the differential amplifier circuitry 72 does not comprise the RC filter 74 located after the differential amplifier 90 that was present in the embodiment of FIG. 9. However, such an additional differential amplifier could be included if desired.

In the above described embodiments, the incremental detector is located on the same side of the scale as the light source used to illuminate the scale (and so it is what is commonly referred to as a reflective system). However, it will be understood that other arrangements are possible. For example, at least the incremental detector could be located on a side of the scale opposite to the light source used to illuminate the scale (and so could be what is commonly referred to as a transmissive system).

The invention claimed is:

1. An incremental encoder apparatus comprising:
   a scale comprising a series of periodic features, which define an optical incremental scale, and at least one magnetic reference mark; and
   a readhead comprising:
      at least one incremental sensor configured to detect light from the optical incremental scale and to output at least one signal dependent thereon, and
      at least two analogue Hall sensors, each comprising at least two output terminal pairs, and each being configured to switch repeatedly between each output terminal pair, wherein the apparatus is configured to generate a reference mark signal from outputs of the at least two analogue Hall sensors, and wherein the apparatus is configured so that the reference mark signal is repeatable to within one period of the incremental scale in at least one direction of travel up to a relative velocity of the incremental scale and the readhead of 0.125 m/s.

2. The incremental encoder apparatus as claimed in claim 1, wherein the apparatus is configured to determine a difference signal that is proportional to a difference of the outputs of the at least two analogue Hall sensors, and wherein the apparatus is configured to generate the reference mark signal using the difference signal.

3. The incremental encoder apparatus as claimed in claim 2, wherein the apparatus is configured to differentially amplify the outputs of the analogue Hall sensors to obtain the difference signal.

4. The incremental encoder apparatus as claimed in claim 2, wherein the apparatus is configured to generate the reference mark signal in response to the difference signal crossing a predetermined threshold.

5. The incremental encoder apparatus as claimed in claim 1, wherein the apparatus is configured to at least partially filter noise caused by the switching between the output terminal pairs.

6. The incremental encoder apparatus as claimed in claim 5, wherein the apparatus comprises a filter comprising a zero configured to produce a positive phase shift in the filter.

7. The incremental encoder apparatus as claimed in claim 1, wherein the apparatus is configured to at least partially filter noise having a frequency at which the switching occurs.

8. The incremental encoder apparatus as claimed in claim 1, wherein the apparatus comprises a multi-pole filter configured to filter noise present in the outputs of the analogue Hall sensors.

9. The incremental encoder apparatus as claimed in claim 8, wherein the multi-pole filter comprises at least first and second single-pole low-pass filters configured to filter noise present in the outputs of the analogue Hall sensors.

10. The incremental encoder apparatus as claimed in claim 1, further configured to generate a pair of phase-offset periodic incremental signals, wherein the reference mark signal is repeatable to ½ Signal Period.

11. The incremental encoder apparatus as claimed in claim 1, wherein a ratio of (i) an extent of the at least one magnetic reference mark in a measuring dimension to (ii) the incremental scale period is at least 50:1.

12. The incremental encoder apparatus as claimed in claim 1, wherein the period of the incremental scale is not greater than 50 μm.

13. The incremental encoder apparatus as claimed in claim 1, wherein an extent of the at least one magnetic reference mark in a measuring dimension is at least 0.5 mm.

14. The incremental encoder apparatus as claimed in claim 1, wherein the apparatus comprises means for applying a positive phase shift to the outputs of the analogue Hall sensors.

15. A readhead for an encoder apparatus comprising:
at least one incremental sensor configured to detect light from an optical incremental scale and to output at least one signal dependent thereon, and
at least two analogue Hall sensors, each comprising at least two output terminal pairs, and each being configured to switch repeatedly between each output terminal pair,
wherein the readhead is configured to determine the presence of a magnetic reference mark on the incremental scale from outputs of the at least two analogue Hall sensors, and
wherein the readhead is configured so that a reference mark signal, which is generated from the outputs of the at least two analogue Hall sensors, is repeatable to within one period of the incremental scale in at least one direction of travel up to a relative velocity of the incremental scale and the readhead of 0.125 m/s.

* * * * *